(12) United States Patent
Cordes et al.

(10) Patent No.: US 8,576,170 B2
(45) Date of Patent: Nov. 5, 2013

(54) JOYSTICK TYPE COMPUTER INPUT DEVICE WITH MOUSE

(75) Inventors: Steven Alan Cordes, Yorktown Heights, NY (US); Debra C. Leach, Hopewell Junction, NY (US); Debra Ann Loussedes, Hopewell Junction, NY (US); Christopher Edward Obszamy, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/987,182

(22) Filed: Jan. 10, 2011

(65) Prior Publication Data
US 2012/0176315 A1 Jul. 12, 2012

(51) Int. Cl.
G09G 5/08 (2006.01)

(52) U.S. Cl.
USPC .................. 345/161; 361/679.1; 715/865

(58) Field of Classification Search
USPC ........ 345/156–167; 463/38; 715/865; 473/56
See application file for complete search history.

(56) References Cited

U.S. PATENT DOCUMENTS

| | | | |
|---|---|---|---|
| 4,486,630 A | 12/1984 | Fetchko | |
| 4,879,556 A | 11/1989 | Duimel | |
| 5,973,471 A * | 10/1999 | Miura et al. | 318/640 |
| 6,121,954 A | 9/2000 | Seffernick | |
| 6,310,606 B1 | 10/2001 | Armstrong | |
| 6,480,184 B1 | 11/2002 | Price | |
| 2002/0133276 A1* | 9/2002 | Onodera | 701/36 |
| 2002/0145587 A1* | 10/2002 | Watanabe | 345/156 |
| 2004/0054566 A1 | 3/2004 | J'Maev | |
| 2004/0257339 A1* | 12/2004 | Takahashi | 345/156 |
| 2005/0077155 A1* | 4/2005 | Wang | 200/6 A |
| 2006/0205565 A1* | 9/2006 | Feldman et al. | 482/8 |
| 2006/0291939 A1* | 12/2006 | McAlindon | 400/489 |
| 2007/0080936 A1* | 4/2007 | Tsuk et al. | 345/156 |
| 2007/0161400 A1* | 7/2007 | Sharp et al. | 455/550.1 |
| 2007/0273648 A1* | 11/2007 | Fussinger | 345/161 |
| 2008/0278448 A1* | 11/2008 | Nilsagard et al. | 345/161 |
| 2008/0303792 A1 | 12/2008 | Chung | |
| 2009/0042609 A1 | 2/2009 | Bloebaum | |
| 2009/0181730 A1* | 7/2009 | Higginson | 455/575.1 |

OTHER PUBLICATIONS

Wobbrock, Jacob O., et al.; Writing with a Joystick: A Comparison of Date Stamp, Selection Keyboard, and EdgeWrite; Proceedings of Graphics Interface; 2004; pp. 1-8.

Wilson, Andrew D., et al.; Text Entry Using a Dual Joystick Game Controller; Proceedings of the SIGCHI Conference on Human Factors in Computing Systems, 2006; pp. 475-478.

Ning, Li; PC Remote Control—The Technology and Application; Mini-Micro Systems; Aug. 2004; vol. 25, No. 8, pp. 1554-1557.

Dinwiddie, J.M., et al.; Combined-User Interface for Computers, Television, Video Recorders, and Telephone, Etc.; IBM TDB, Aug. 1990; No. 3b.

Rao, R.S., et al.; Evaluation of an Isometric and a Position Joystick in a Target Acquisition Task for Individuals with Cerebral Palsy, IEEE Trans Rehab. Engr.; Mar. 2000; vol. 8, No. 1; pp. 118-125.

* cited by examiner

Primary Examiner — Amare Mengistu
Assistant Examiner — Premal Patel
(74) Attorney, Agent, or Firm — Yuanmin Cai; Howard M. Cohn

(57) ABSTRACT

A user input device includes a base that has a top surface. Flexibly attached to the base is a joystick. Character indicia are displayed on the base, and each indicium corresponds to a unique joystick position or motion sequence. The user input device has a processor and non-volatile memory that stores machine-readable instructions, that when executed by the processor, transmit a code associated with the unique joystick position or motion sequence.

12 Claims, 8 Drawing Sheets

JOYSTICK TYPE COMPUTER INPUT DEVICE WITH MOUSE

FIELD OF THE INVENTION

The present invention relates in general to improved computer user interface devices and in particular to an improved computer user interface for use by mobility-impaired users.

BACKGROUND OF THE INVENTION

Standard keyboards for computer input have limitations which can make them incompatible for certain individuals and circumstances. They are designed largely for office environments for individuals with full use of their hands. To work effectively with a standard, QWERTY type keyboard a user preferably will use two hands which can span the keyboard and have the dexterity of all fingers. A standard keyboard also requires significant dexterity to enable use. Individuals with handicaps such as missing limbs or hand agility issues cannot use or effectively use standard keyboards. Similarly, a standard keyboard is not an effective mobile device, such as would be used in the field.

For an individual with hand dexterity or range-of-motion issues, a computer keyboard is difficult or impossible to maneuver. Users with range of motion issue will have difficulty traveling across the keyboard. Those with use of only a single hand are hampered by not only having to travel farther, but losing the ability to rest the heel of their hand, while leaving their fingers hovering over the keyboard.

Even the ability to hold fingers hovering over keys is physically more demanding on an individual with a physical handicap. Those with agility issues will have difficulty pressing a single key. There are some prior art handicap specific devices designed for users with reduced dexterity. The most common device is a keyboard with larger keys. This device does not solve the problem of a single handed user. It also increases the challenge on those with range-of-motion issues, and since it is relatively large, it is also cumbersome and non-portable.

Standard keyboards also present challenges for those who need to or prefer to work with a single hand, such as in the field or for workstation use in which the second hand is occupied (such as a designer who keeps her hand on a tablet or mouse). A standard keyboard is too large and cumbersome for mobile use. It also is not conducive for single hand use as it requires extended finger and even hand travel to reach all keys. This also makes it impossible to type without looking at the keyboard, which is undesirable in most situations. Therefore, it is desirable to have an improved computer input device that overcomes the shortcomings of prior art devices.

SUMMARY

In one embodiment of the present invention, a user input device is provided. It comprises a base that has a top surface. Flexibly attached to the base is a joystick. Character indicia are displayed on the base, and each indicium corresponds to a unique joystick position. The user input device has a processor and non-volatile memory. The non-volatile memory stores machine-readable instructions, that when executed by the processor, transmit a code associated with the unique joystick position.

In one embodiment of the present invention, a user input device is provided. It comprises a base that has a top surface. Flexibly attached to the base is a joystick. Character indicia are displayed on the base, and each indicium corresponds to a unique motion sequence. The user input device has a processor and non-volatile memory. The non-volatile memory stores machine-readable instructions, that when executed by the processor, transmit a code associated with the unique motion sequence.

In another embodiment, a method of using a user input device is provided. The method comprises transmitting a specific character code to a host device when the joystick is deflected to a particular direction and particular angular position.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

Often, similar elements may be referred to by similar numbers in various figures (FIGs) of the drawing, in which case typically the last two significant digits may be the same, the most significant digit being the number of the drawing figure (FIG).

FIG. 1 is a block diagram of an embodiment of the present invention.

FIG. 2 is a perspective view of an embodiment of the present invention.

FIG. 3 is a top-down view an alternative embodiment.

FIG. 4 is a top-down view of an alternative embodiment having indicia.

FIG. 4B is a side view of an embodiment indicating various joystick positions.

FIG. 5 illustrates example character sequence motions.

FIG. 6A-6C are flowcharts indicating process steps for embodiments of the present invention.

DETAILED DESCRIPTION

Figure 1:
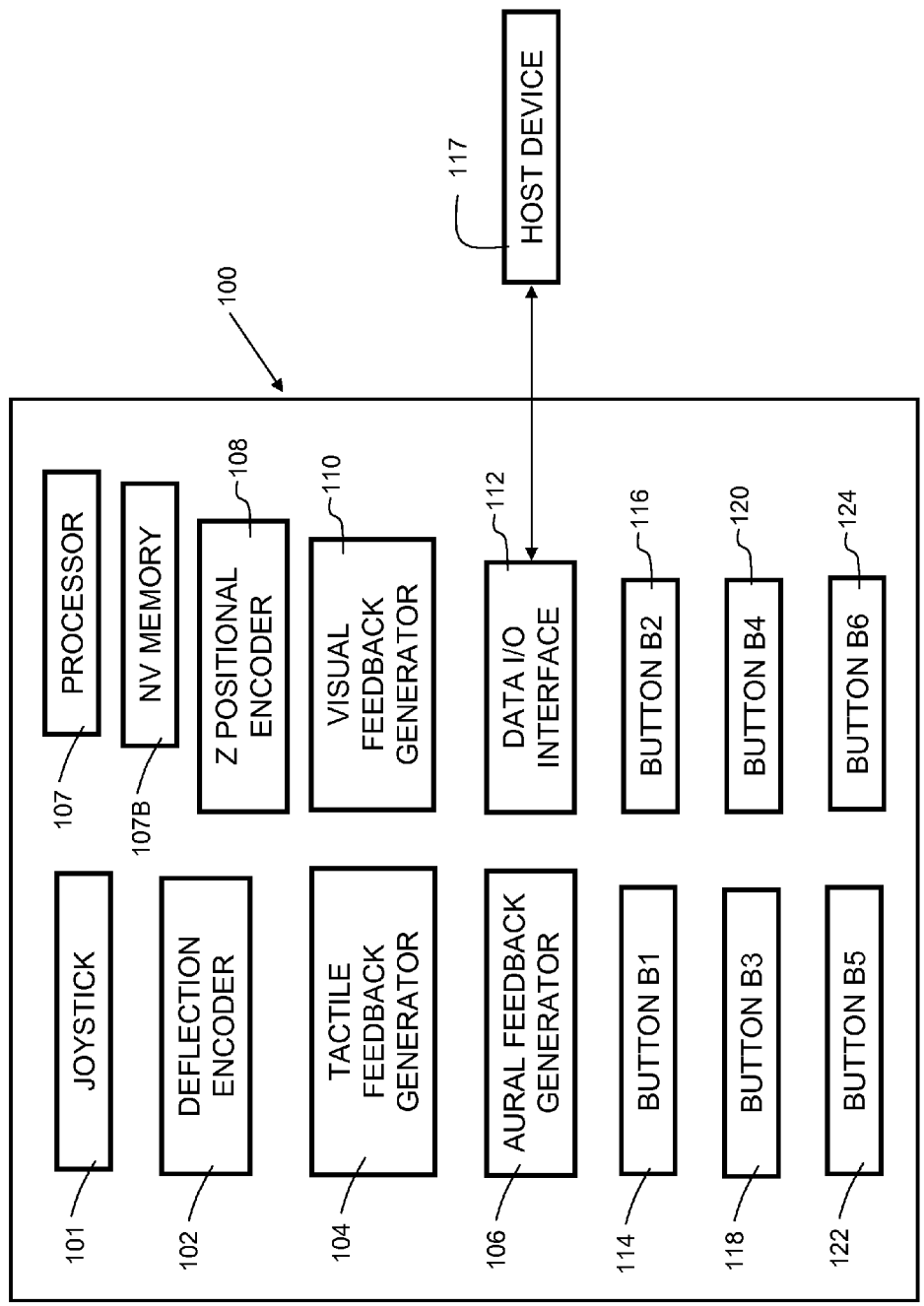

FIG. 1 is a block diagram of user input device 100 in accordance with an embodiment of the present invention. User input device 100 comprises a joystick 101. Joystick 101 is moveable in a 360 degree range from a neutral (vertical) position. For convenience, compass direction nomenclature may be used to describe the direction of the joystick (e.g., north, south, southwest). The amount of deflection from the neutral position is measured in degrees. In one embodiment, the deflection ranges from 0 to 80 degrees. Deflection encoder 102 provides an indication of the direction and amount of deflection of the joystick. For example, deflection encoder 102 may provide an indication of 30 degrees deflection in the northeast direction.

Tactile feedback generator 104 provides a tactile indication to the user based on joystick position. Tactile feedback generator 104 may comprise a vibrator mechanism disposed to vibrate the joystick briefly when the deflection reaches a predetermined value. For example, in one embodiment, as the joystick oriented at a deflection angle of 20, 40, and 60 degrees, a brief vibration is induced in joystick 101, which provides the user with feedback regarding the position of the joystick.

Aural feedback generator 106 provides audio feedback regarding the joystick position. In one embodiment, aural feedback generator 106 comprises a piezoelectric buzzer. In one embodiment, the aural feedback generator generates a sound as the joystick is deflected to a range of 20, 40, and 60 degrees. In one embodiment, a different sound is used for each indicated joystick position. For example, a "short" sound of 200 to 300 milliseconds may be used to indicate a 20 degree deflection, whereas progressively longer sounds are used for higher levels of joystick deflection, such as a sound having 500 to 600 millisecond duration to indicate a 40 degree deflection level, and a sound having 700 to 800 millisecond duration to indicate a 60 degree deflection level. Note that the deflection levels of 20, 40, and 60 degrees are provided for illustrative purposes, and other deflection levels (positions) may be indicated in other embodiments of the present invention.

Visual feedback generator 110 is optionally used to provide a visual indication of when the joystick deflection reaches a predetermined value. In one embodiment, visual feedback generator 110 comprises a light-emitting diode (LED) configured to briefly (e.g. 300 to 500 milliseconds) illuminate as the joystick is deflected to a range of 20, 40, and 60 degrees.

Z positional encoder 108 provides an indication of downward movement of the joystick 101. In one embodiment, the joystick 101 may be pushed straight down, with no deflection. The Z positional encoder 108 detects the change in Z direction, and provides a downward indication when the joystick 101 is in a "Z-down" position. In one embodiment, the Z-down position is used to toggle the user input device 100 from a character entry mode to a cursor control mode. In this way, the user input device 100 can quickly toggle between character entry functions, emulating a keyboard, and cursor control functions, emulating a mouse. In one embodiment, transition from the Z-down position to the neutral position toggles the mode of the user input device 100 between character entry mode and cursor control mode. In another embodiment, the transition from the normal position to the Z-down position puts the user input device 100 into cursor control mode, and the transition from the Z-down position to the normal position puts the user input device 100 into character entry mode.

Data I/O (input-output) interface 112 provides communication to and from a host device 117, such as a computer. In one embodiment, Data I/O interface 112 comprises a USB (universal serial bus) interface. Other embodiments may include, but are not limited to, a serial interface (e.g. using RS-232), or a wireless interface such as infrared or radio. A radio interface may comprise Bluetooth, Zigbee, or other wireless standard. The Data I/O interface 112 transmits codes to the host device 117. The codes may represent a displayable character, such as an alphanumeric character or symbol. The codes may also represent control codes, such as "SPACE," "BACKSPACE," and "TAB", for example.

Buttons 114-124 are used to provide additional user input control. While the embodiment shown uses six buttons (B1-B6), other embodiments may utilize more or fewer buttons, depending on the intended application.

Processor 107 is preferably a microcontroller which receives input from the deflection encoder 102 and Z positional encoder 108. In response to input from those encoders, processor 107 may activate the tactile feedback generator 104, visual feedback generator 110, and aural feedback generator 106 to indicate the position of the joystick. Processor 107 interfaces with non-volatile memory 107B, which stores machine-readable instructions, that when executed by processor 107, perform the tasks of receiving input from encoders 102 and 108, and controlling feedback generators 104, 106, and 110.

Figure 2:
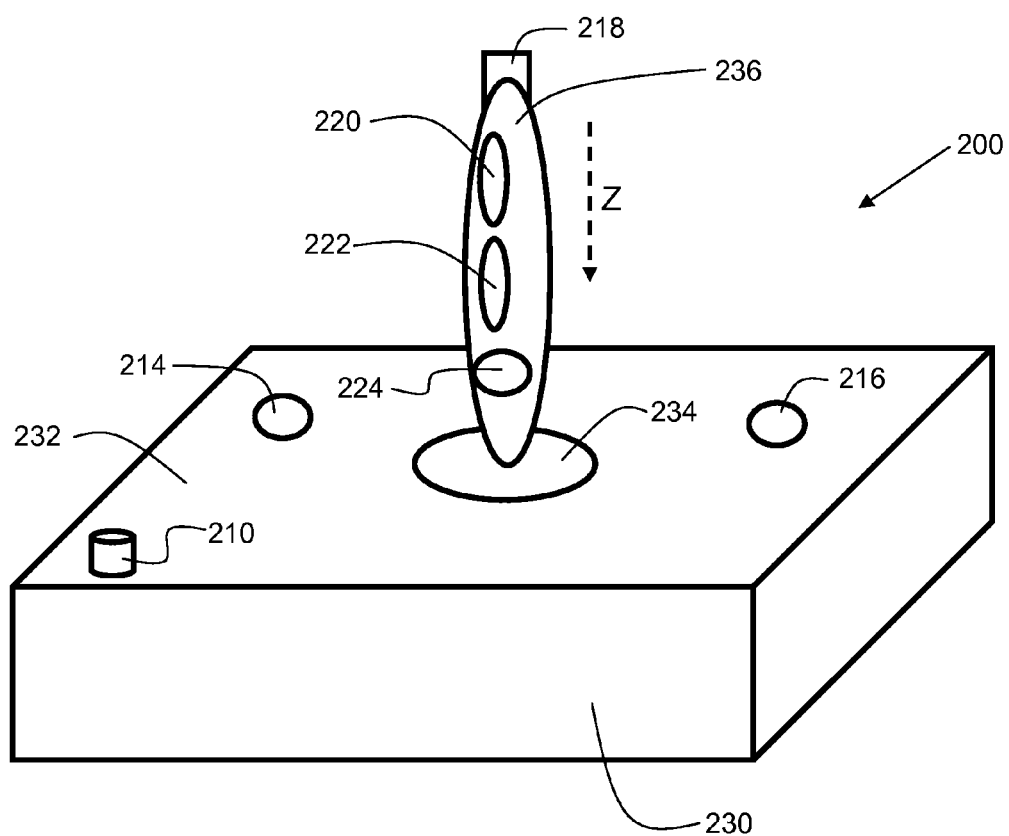

FIG. 2 is a perspective view of a user input device 200 in accordance with an embodiment of the present invention. User input device 200 comprises base 230 and joystick 236 flexibly mounted on base 230. Disposed on joystick 236 are four buttons: 218, 220, 222, and 224. Button 218 is positioned on the top of joystick 236, and is operated by pressing down on the button, typically with the thumb of a user. Buttons 220, 222, and 224 are disposed on the side of the joystick 236, and are typically operated with the fingers (non-thumb). Base 230 comprises top surface 232. Buttons 214 and 216 are disposed on top surface 232. Optionally, a visual indictor, such as an LED (light-emitting diode) 210 is also disposed on base 232. Buttons 218, 220, 222, and 224 correspond to buttons B1, B2, B3, and B4 respectively from FIG. 1. Buttons 214 and 216 correspond to buttons B5 and B6 from FIG. 1.

Figure 3:
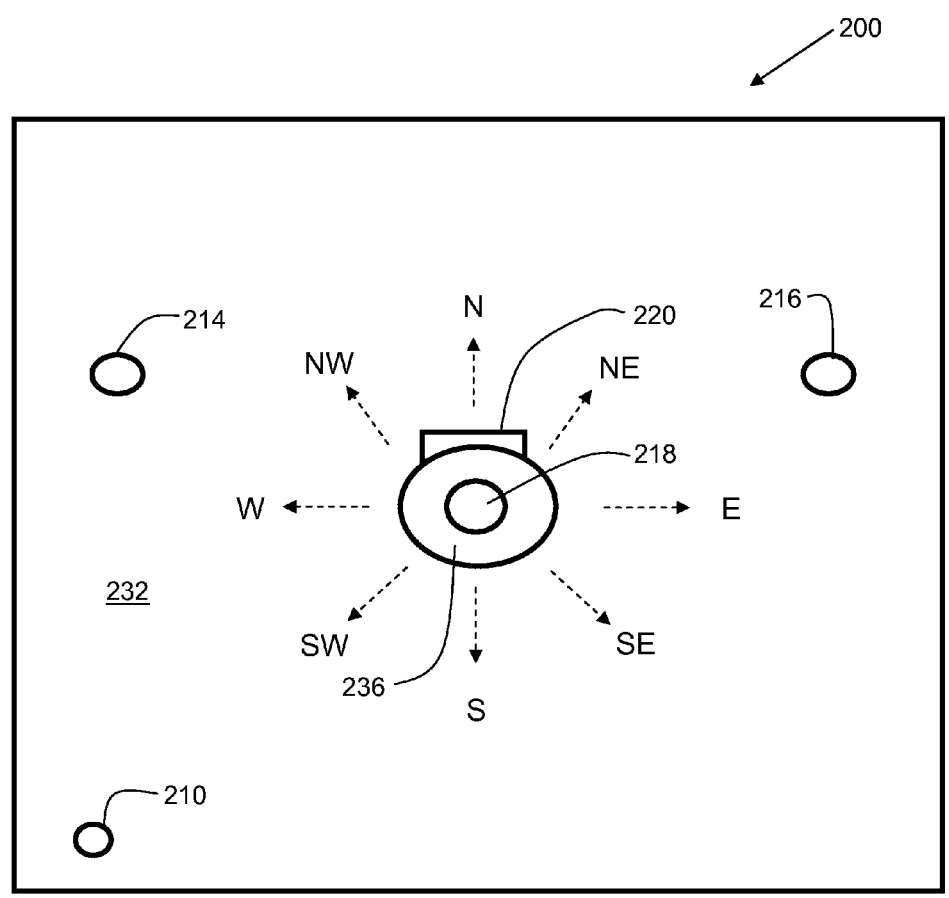

FIG. 3 is a top-down view of user input device 200. Directional markings pertaining to compass directions (e.g., N for North, NE for Northeast) are shown for the purposes of describing joystick operations. In practice, other indicia may be shown on the top surface 232. The dotted arrows indicate allowable movement of joystick 236 in those directions.

Figure 4:
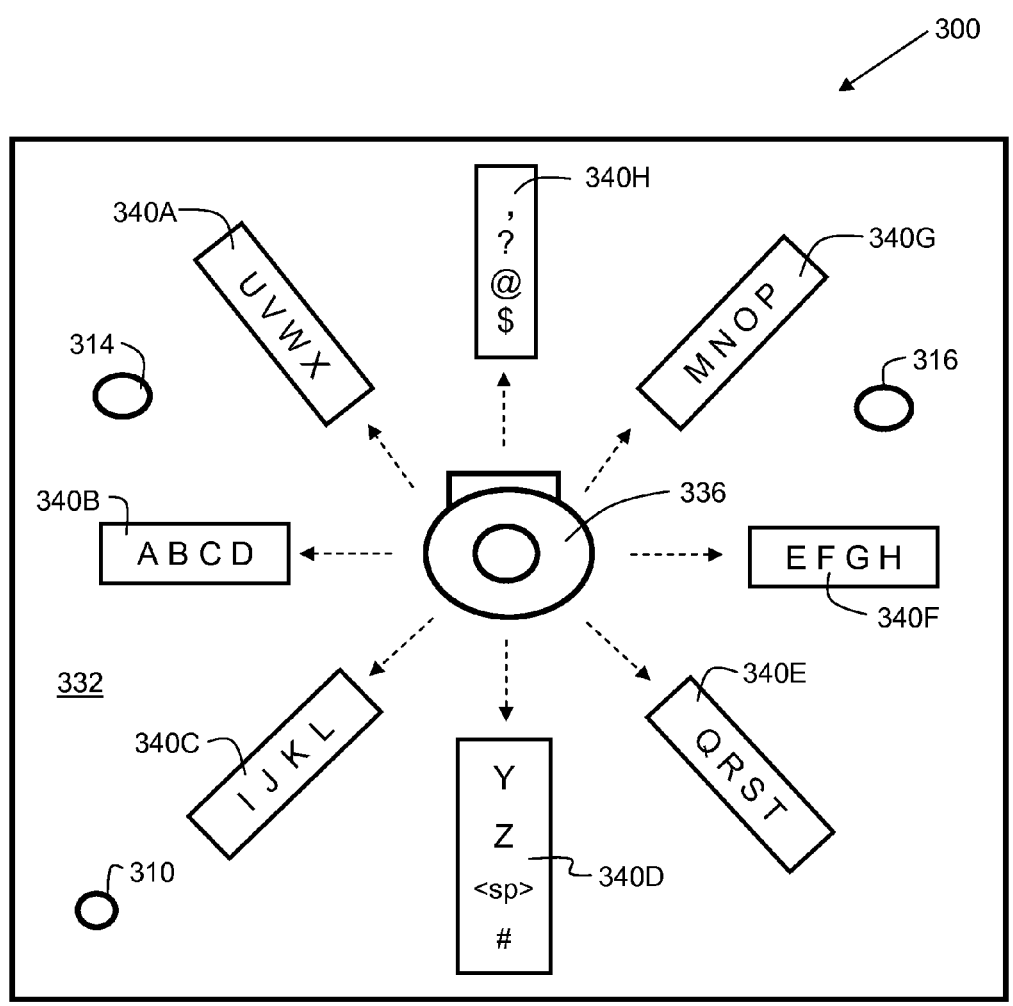

FIG. 4 is a top-down view of user input device 300. Similar to user input device 200 of FIG. 2, visual indicator 310, and buttons 314 and 316 are disposed on top surface 332. Eight sets of indicia (340A-340H) are presented on top surface 332. Each set of indicia comprises a plurality of character subsets. In one embodiment, the character subsets are comprised of English alphabet characters. For example, indicium 340E comprises characters Q, R, S, and T, and indicium 340F comprises characters E, F, G, and H. The four characters are associated with four positions, the first position, second position, third position, and fourth position. Hence, each character corresponds to a unique joystick position defined by its direction and deflection angle. In one embodiment, each character subset corresponds to a joystick direction. For example, the character subset shown in indicium 340G corresponds to the northeast joystick direction. Hence, the character "N" corresponds to the northeast direction, second position.

While the input device 300 shown in FIG. 4 has four characters in each subset, in other embodiments (not shown), the number of characters within each subset may differ. For example, one subset could have five characters while another subset could have three characters.

When user input device 300 is used for character entry into a computer system, the user deflects the joystick to the desired position in the desired direction and holds the joystick in that position for a predetermined time period (e.g. 300-500 milliseconds). This time period is referred to as the character entry hold (CEH) time. Once the joystick is in that position for the CEH time, a code pertaining to the corresponding character is sent from the user input device 300 to the host device (see 117 of FIG. 1). For example, to enter a "C" character, the user moves the joystick to the second position to the west, and to enter a "Q" character, the user moves the joystick to the first position to the southeast. In each case, the user holds the joystick in that position for the CEH time interval to register the character entry. In one embodiment, visual indicator 310 blinks to indicate that the joystick has been held in a position for the CEH time, thus registering a character entry.

Embodiments of the present invention also provide a way to manipulate a cursor with the user input device. In one embodiment, cursor control mode is entered by pressing down on the joystick while the joystick is in the neutral position. Once in the cursor control mode, the user input device 300 transmits positional information to a computer to enable control of a cursor.

Figure 4B:
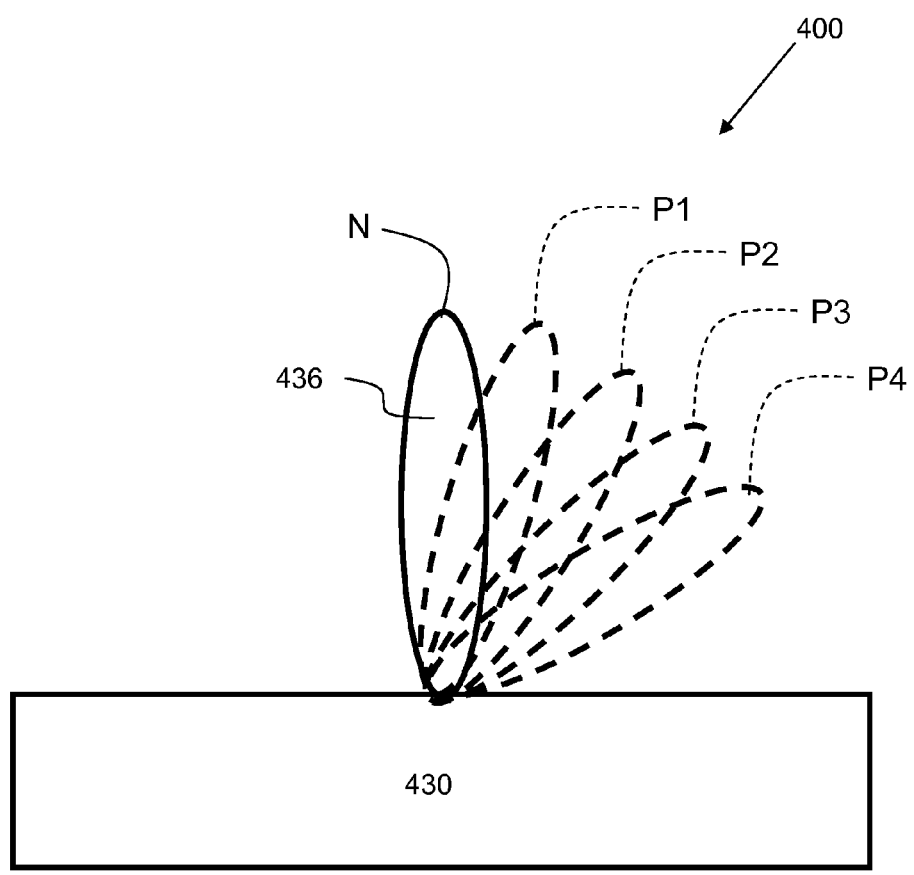

FIG. 4B is a side view of user input device 400 indicating various joystick positions. Joystick 436 is connected to base 430. The neutral position, indicated by reference N, is the default position when the user is not moving the joystick, and is a "straight" position with no angular deflection. Position P1 is the first position, position P2 is the second position, position P3 is the third position, and position P4 is the fourth position. Each position has progressively more angular deflection. For example, position P2 has more angular deflection than position P1, and position P3 has more angular deflection than position P2. Each position (P1-P4) corresponds to a particular predetermined deflection angle. In one embodiment, P1 corresponds to a deflection angle of 10 degrees (deviation from neutral position), P2 corresponds to a deflection angle of 20 degrees, P3 corresponds to a deflection angle of 30 degrees, and P4 corresponds to a deflection angle of 40 degrees.

Figure 5A:
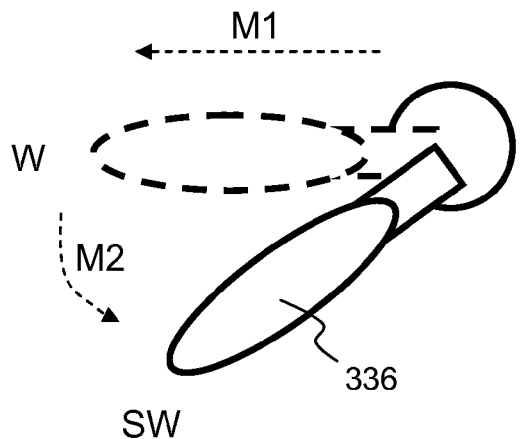
Figure 5B:
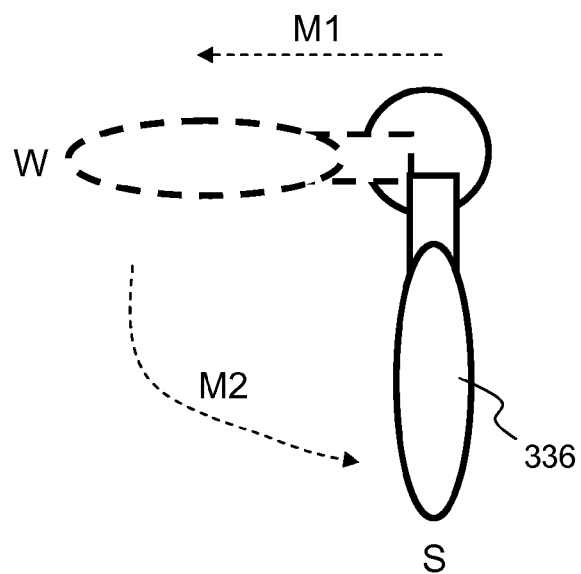

FIG. 5 illustrates example character sequence motions for an alternative method of character entry. In this method of character entry, a unique motion sequence defines a character. For example, moving the joystick west, followed by a movement to the southwest position represents an "A" character as depicted in FIG. 5A, and moving the joystick west, followed by a movement to the south position represents a "B" character, as depicted in FIG. 5B. In this embodiment, two movements define a character. Arrow M1 indicates the first movement in FIGS. 5A and 5B, and arrow M2 indicates the second movement. In general, with a joystick having D directions to move in, and using 2 movements per character, there are (D)×(D−1) possible combinations. In an embodiment with a joystick capable of moving in 8 directions, this results in 56 possible motion sequences for character entry.

Figure 6A:
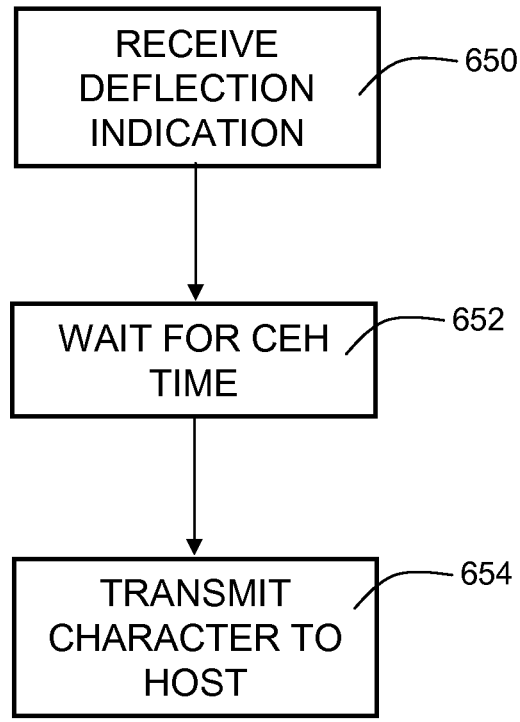

FIG. 6A is a flowchart indicating process steps for an embodiment of the present invention. In process step 650, a deflection indication is received. This indication originates from deflection encoder 102 (see FIG. 1). In process step 652, a predetermined time interval, referred to as the character entry hold (CEH) time elapses while continuing to receive the deflection indication. In process step 654, a character corresponding to the deflection indication is transmitted to the host device (e.g., 117 of FIG. 1).

Figure 6B:
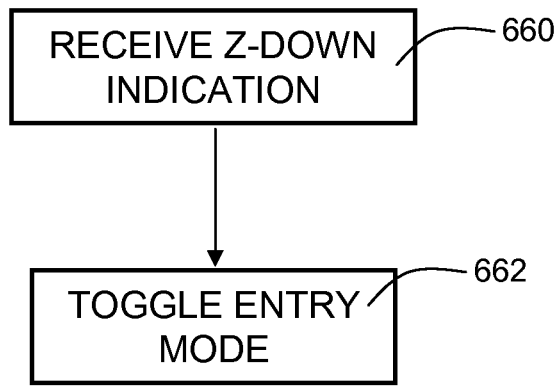

FIG. 6B is a flowchart indicating process steps for an embodiment of the present invention. In process step 660, a Z-Down indication is received. This indication originates from Z positional encoder 108 (see FIG. 1). In process step 662, the entry mode is toggled between character entry mode and cursor control mode.

Figure 6C:
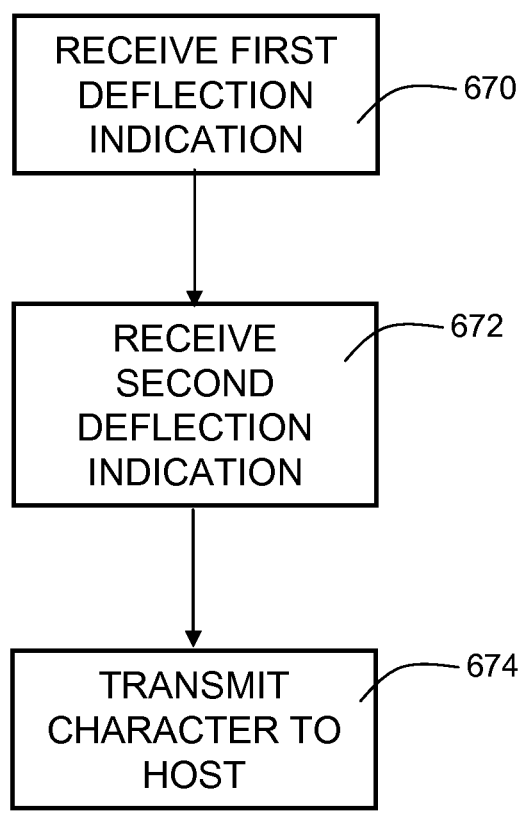

FIG. 6C is a flowchart indicating process steps for an embodiment of the present invention. In process step 670, a first deflection indication is received. In process step 672, a second deflection indication is received. In process step 674, a character code is transmitted to the host device (see 117 of FIG. 1) that is associated with the sequence of the first and second deflections. This corresponds to the operations shown in FIGS. 5A and 5B. For example, in FIG. 5A, the first deflection is a west deflection, and the second deflection is a southwest deflection. The sequence of west, followed by southwest, maps to the "A" character. In one embodiment, a sequence table is stored in non-volatile memory (107B of FIG. 1) which stores a relationship between deflection sequences and characters. Hence, for each deflection sequence detected by processor 107 (FIG. 1), the sequence table in memory 107B is checked to determine which character code to send to host device 117 via data I/O interface 112.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A user input device, comprising:
a base comprising a top surface;
a joystick comprising a first end and a second end, wherein the first end of the joystick is flexibly attached to the base, wherein the base provides multiple unique joystick positions for placing the joystick, wherein each unique joystick position represents a different character;
a processor; and
non-volatile memory storing machine-readable instructions, that when executed by the processor, cause the processor to transmit a code corresponding to said different character in response to the joystick being held in an angular deflection position for a duration equivalent to a character entry hold time ranging from 300 milliseconds to 500 milliseconds, and further comprising a visual indicator configured and disposed to generate an indication in response to the joystick being held in a position for the character entry hold time; and further comprising a Z positional encoder, the Z positional encoder configured and disposed to toggle the user input device between a character entry mode and a cursor control mode when the joystick is moved to a Z-down position in an undeflected orientation.

2. The user input device of claim 1, further comprising:
character indicia displayed on the base, wherein each indicium corresponds to said different character and indicates said each unique joystick position.

3. The user input device of claim 2, wherein the character indicia is arranged in a plurality of character subsets, each character subset corresponding to a joystick direction, and each character subset comprising a plurality of characters, wherein each character within each character subset corresponds to a deflection level.

4. The user input device of claim 3, wherein the plurality of characters in each character subset comprises four characters.

5. The user input device of claim 4, wherein the plurality of characters comprise English alphabet characters.

6. The user input device of claim 1, further comprising a tactile feedback generator, the tactile feedback generator configured and disposed to impart a tactile indication to a user.

7. The user input device of claim 6, wherein the tactile feedback generator comprises a vibrator, the vibrator configured and disposed to induce vibrations in the joystick when the joystick is oriented at a predetermined deflection angle.

8. The user input device of claim 1, further comprising an aural feedback generator, the aural feedback generator configured and disposed to produce a sound when the joystick is oriented at a predetermined deflection angle.

9. The user input device of claim 1, further comprising a visual feedback generator, the visual feedback generator configured and disposed to produce a visual indication when the joystick is oriented at a predetermined deflection angle.

10. The user input device of claim 9, wherein the visual feedback generator comprises a light-emitting diode disposed on the base, and wherein the light-emitting diode illuminates when the joystick is oriented at the predetermined deflection angle.

11. The user input device of claim 1, wherein the unique joystick positions represents at least the entire set of 26 English alphabetic characters.

12. A method of using a user input device comprising a joystick, comprising:

transmitting a character code when the joystick is deflected to a particular direction and particular angular position for a duration equivalent to a character entry hold time ranging from 300 milliseconds to 500 milliseconds, and further comprising a visual indicator configured and disposed to generate an indication in response to the joystick being held in a position for the character entry hold time; and further comprising toggling the user input device from a character entry mode to a cursor control mode when the joystick is moved to a Z-down position in an undeflected orientation.

* * * * *